US011042335B2

United States Patent
Kiyose

(10) Patent No.: US 11,042,335 B2
(45) Date of Patent: Jun. 22, 2021

(54) IMAGE FORMING SYSTEM WHICH CONTINUES IMAGE FORMATION OF CONFIDENTIAL DOCUMENT UNDER CONDITION THAT PRESENCE OF EXECUTOR IS CONFIRMED

(71) Applicant: KYOCERA Document Solutions Inc., Osaka (JP)

(72) Inventor: Kenji Kiyose, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/687,944

(22) Filed: Nov. 19, 2019

(65) Prior Publication Data
US 2020/0167104 A1 May 28, 2020

(30) Foreign Application Priority Data
Nov. 27, 2018 (JP) .............................. JP2018-220832

(51) Int. Cl.
*G06F 3/12* (2006.01)
*G06F 16/93* (2019.01)
*H04L 29/06* (2006.01)

(52) U.S. Cl.
CPC .......... *G06F 3/1222* (2013.01); *G06F 3/1238* (2013.01); *G06F 16/93* (2019.01); *H04L 63/083* (2013.01); *H04L 63/0861* (2013.01)

(58) Field of Classification Search
None
See application file for complete search history.

(56) References Cited

U.S. PATENT DOCUMENTS 6,378,070 B1 *  4/2002  Chan ..................... G06F 21/608
                                                        380/255
6,751,732 B2 *  6/2004  Strobel ................. G06F 21/608
                                                        380/255
(Continued)

FOREIGN PATENT DOCUMENTS

JP          2009182753 A       8/2009

OTHER PUBLICATIONS

Machine translation of Japanese Appl. No. 2009-182753 to Takahashi. (Year: 2009).*

*Primary Examiner* — Paul F Payer
(74) *Attorney, Agent, or Firm* — Studebaker & Brackett PC

(57) ABSTRACT

An image forming apparatus includes: a biometric information reading section which acquires biometric information of a printing executor; a biometric information sending section which sends the biometric information acquired by the biometric information reading section to an authentication server; a confidential printing section which starts image formation of a confidential document when the printing executor has been authenticated by the authentication server; storage which stores therein the biometric information acquired by the biometric information reading section as comparison biometric information; and an authentication section which performs presence confirmation of the printing executor by acquiring biometric information through the biometric information reading section and comparing the biometric information to the comparison biometric information during the image formation of the confidential document. The confidential printing section continues the image formation of the confidential document under a condition that the presence of the printing executor is confirmed by the authentication section.

4 Claims, 7 Drawing Sheets

(56) References Cited

U.S. PATENT DOCUMENTS

| | | | |
|---|---|---|---|
| 8,453,259 B2 * | 5/2013 | Ueda | H04L 9/3231 |
| | | | 726/30 |
| 8,896,858 B2 * | 11/2014 | Zehler | G06K 15/00 |
| | | | 358/1.14 |
| 9,377,980 B2 * | 6/2016 | Park | G06F 3/126 |
| 2003/0038965 A1 * | 2/2003 | Simpson | G06K 15/005 |
| | | | 358/1.15 |
| 2006/0221375 A1 * | 10/2006 | Nagarajan | G06F 3/1222 |
| | | | 358/1.14 |
| 2007/0109588 A1 * | 5/2007 | Saijo | B41J 11/008 |
| | | | 358/1.14 |

* cited by examiner

US 11,042,335 B2

IMAGE FORMING SYSTEM WHICH CONTINUES IMAGE FORMATION OF CONFIDENTIAL DOCUMENT UNDER CONDITION THAT PRESENCE OF EXECUTOR IS CONFIRMED

INCORPORATION BY REFERENCE

The present application claims priority under 35 U.S.C. § 119 to Japanese Patent Application No. 2018-220832, filed on Nov. 27, 2018. The contents of this application are incorporated herein by reference in their entirety.

BACKGROUND

The present disclosure relates to an image forming system including an image forming apparatus such as a printer, a copier, or a multifunction peripheral.

A technique has been proposed for a case in which an image of a confidential document is formed (printed) through an image forming apparatus over a network. The confidential document is for example an important document, and requires security protection. According to the technique, authentication information of a user attached to confidential print data is sent to the image forming apparatus and printing is output under a condition that the user is authenticated.

SUMMARY

An image forming system according to an aspect of the present disclosure includes: an image forming apparatus which performs image formation of a received confidential document; and an authentication server which authenticates, based on biometric information, an executor who is to operate the image forming apparatus to perform the image formation. The image forming apparatus and the authentication server are connected through a network. The image forming apparatus includes: confidential document storage which stores the received confidential document therein; a biometric information reading section which reads and acquires biometric information of the executor; a biometric information sending section which sends the biometric information acquired by the biometric information reading section to the authentication server; a confidential image forming section which starts the image formation of the confidential document when the executor has been authenticated by the authentication server; biometric information storage which stores therein the biometric information acquired by the biometric information reading section as comparison biometric information; and an authentication section which executes presence confirmation of the executor by acquiring biometric information through the biometric information reading section and comparing the biometric information to the comparison biometric information during the image formation of the confidential document. The confidential image forming section continues the image formation of the confidential document under a condition that the presence of the executor is confirmed by the authentication section and suspends the image formation of the confidential document when the presence of the executor is not confirmed by the authentication section within a prescribed period.

DETAILED DESCRIPTION

The following describes an embodiment of the present disclosure in detail with reference to the accompanying drawings. In the following embodiment, configuration indicating the same functions is labeled with the same reference signs.

Figure 1:
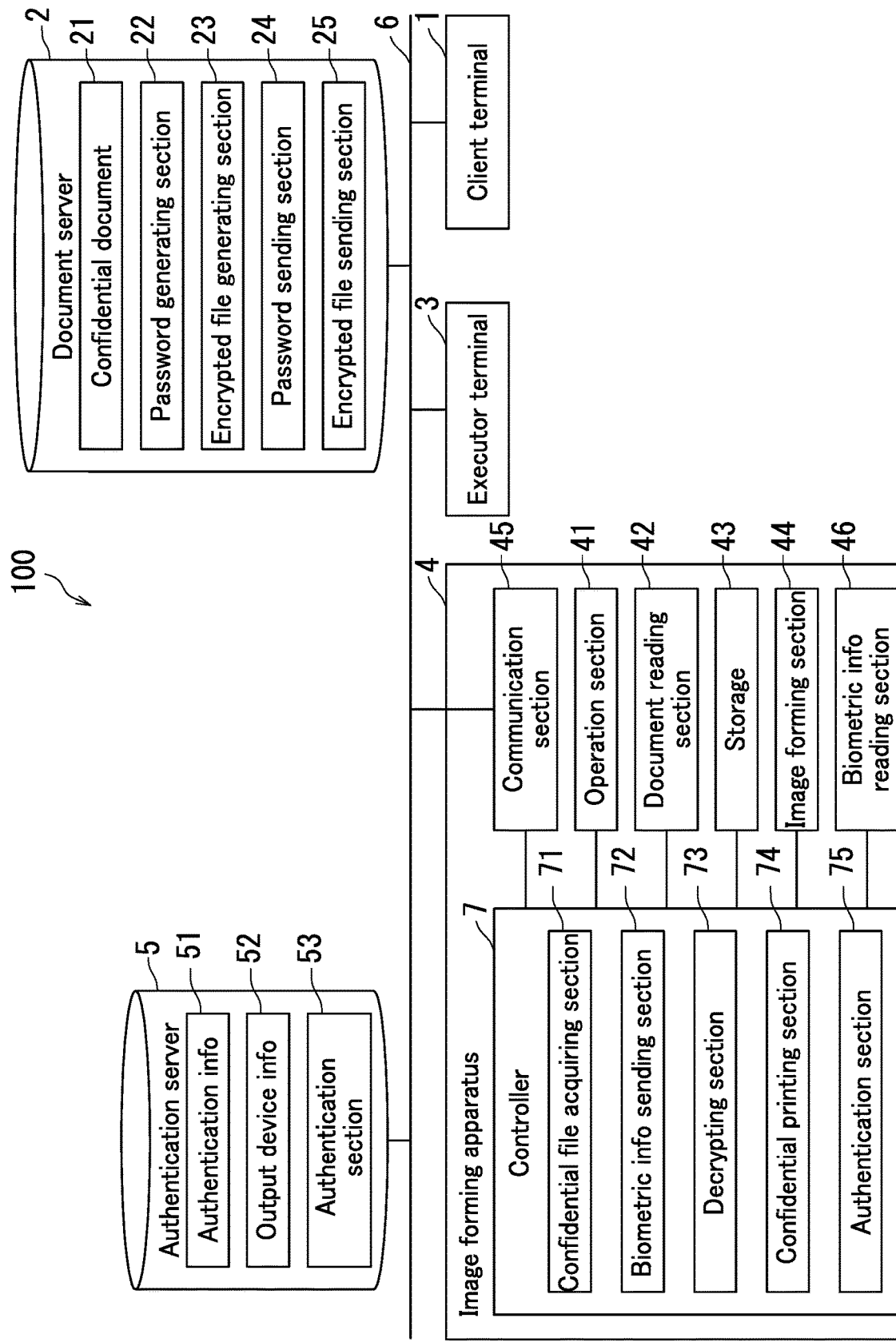
FIG. 1 is a system configuration diagram illustrating a general configuration of an image forming system according to an embodiment of the present disclosure.

Referring to FIG. 1, an image forming system according to the present embodiment includes a client terminal 1, a document server 2, an executor terminal 3, an image forming apparatus 4, and an authentication server 5 connected to each other through a network 6 such as a local area network (LAN).

The document server 2 is an information processing device which includes a processor such a central processing unit (CPU), read-only memory (ROM), random-access memory (RAM), and the like, and operates under program control. The document server 2 includes non-volatile storage such as semiconductor memory or a hard-disk drive (HDD), and stores therein a confidential document 21 in a state where access authority has been set.

The document server 2 functions as a password generating section 22, an encrypted file generating section 23, a password sending section 24, and an encrypted file sending section 25. The password generating section 22 generates a one-time password (hereafter referred to as an encryption password) which encrypts a confidential printing file including the confidential document 21, and generates a one-time password (hereafter referred to as an access password) for accessing the encrypted file. The encrypted file generating section 23 generates the encrypted file by encrypting the confidential printing file using the encryption password. The password sending section 24 sends the encryption password and the access password to the executor terminal 3. The encrypted file sending section 25 sends the encrypted file authenticated with the access password to the image forming apparatus 4.

The client terminal 1 is an information processing device operated under program control, such as a personal computer used by a printing client A. The printing client A has authority to access the confidential document 21 stored on the document server 2.

The executor terminal 3 is an information processing device operated under program control, such as a personal computer used by a printing executor B. The printing executor B is requested to print the confidential document 21 by the printing client A.

The image forming apparatus 4 is a copier including a print function. The image forming apparatus 4 includes an operation section 41, a document reading section 42, storage 43, an image forming section 44, a communication section 45, a biometric information reading section 46, and a controller 7.

The operation section 41 is a user interface including various operation keys or a touch panel in which a transparent pressure sensor is provided on a surface of a liquid-crystal display panel. The operation section 41 functions as an input section, a display section, and an audio output section.

The document reading section 42 is a scanner which reads a document image. The document reading section 42 reads a document image by irradiating a document with light and receiving light reflected by the document. The document is fed by an unillustrated document feeder device or placed on platen glass by a user.

Examples of the storage 43 include semiconductor memory or an HDD.

The image forming section 44 records an image on recording paper. The image forming section 44 includes a photosensitive drum, a charger, an exposure section, a developing section, a transfer section, a cleaner, and a fixing section, for example.

The communication section 45 has a function of sending and receiving various data between the client terminal 1, the document server 2, the executor terminal 3, and the authentication server 5 over the network 6.

The biometric information reading section 46 reads and acquires the biometric information of the printing executor B. The biometric information reading section 46 is constituted by various sensors or cameras. The biometric information reading section 46 acquires one or more of the following as the biometric information of the printing executor B: a fingerprint image, an iris image, a retinal image, a vein image, and a facial image.

The controller 7 is an information processor such as a microcomputer including a processor such as a CPU, ROM, RAM, and the like. A control program for controlling operation of the image forming apparatus 4 is stored in the ROM. The processor of the controller 7 reads out the control program stored in the ROM and loads the control program in the RAM to control the entire apparatus according to instruction information.

The controller 7 functions as a confidential file acquiring section 71, a biometric information sending section 72, a decrypting section 73, a confidential printing section 74, and an authentication section 75 by executing the control program.

The confidential file acquiring section 71 sends a file request to the document server 2 upon receiving a confidential print job. The confidential print job is equivalent to an example of a "confidential image forming job". The confidential print job is sent from the executor terminal 3. The file request includes a file address, an access password, and a function list of the image forming apparatus 4. The confidential file acquiring section 71 receives an encrypted file from the document server 2 and stores the encrypted file in the storage 43.

The biometric information sending section 72 sends the biometric information acquired by the biometric information reading section 46 and a user ID specifying the printing executor B to the authentication server 5. The biometric information sending section 72 stores the biometric information acquired by the biometric information reading section 46 in the storage 43 as comparison biometric information.

The decrypting section 73 decrypts the encrypted file into a confidential printing file using the encryption password. The confidential printing file includes the confidential document 21 and a printing profile. The printing profile is equivalent to an example of an "image formation profile".

The confidential printing section 74 prints the confidential document 21 with the settings of the printing profile.

The authentication section 75 causes the biometric information reading section 46 to acquire biometric information during printing. The authentication section 75 compares the biometric information acquired by the biometric information reading section 46 with the comparison biometric information stored in the storage 43. The authentication section 75 compares the biometric information to the comparison biometric information and performs presence confirmation of the printing executor B.

The authentication server 5 is an information processing device which includes a processor such as a CPU, ROM, RAM, and the like, and is operated under program control. The authentication server 5 includes non-volatile storage such as semiconductor memory or an HDD, and stores authentication information 51 and output device information 52 therein.

The authentication information 51 is information for authenticating whether or not the printing executor B operating the image forming apparatus 4 is a person for whom the comparison biometric information is stored in the storage 43. The comparison biometric information to be compared to the biometric of the printing executor B acquired by the biometric information reading section 46, such as a fingerprint image, an iris image, a retinal image, a vein image, or a facial image, is registered as the authentication information 51.

The output device information 52 is information about the image forming apparatus 4 through which printing of the confidential document 21 is permitted. A media access control (MAC) address or an internet protocol (IP) address specifying the image forming apparatus 4 is registered in the output device information 52.

The authentication server 5 compares the biometric information received from the image forming apparatus 4 to the authentication information 51. The authentication server 5 functions as an authentication section 53 which sends the comparison result to the image forming apparatus 4.

Figure 2A:
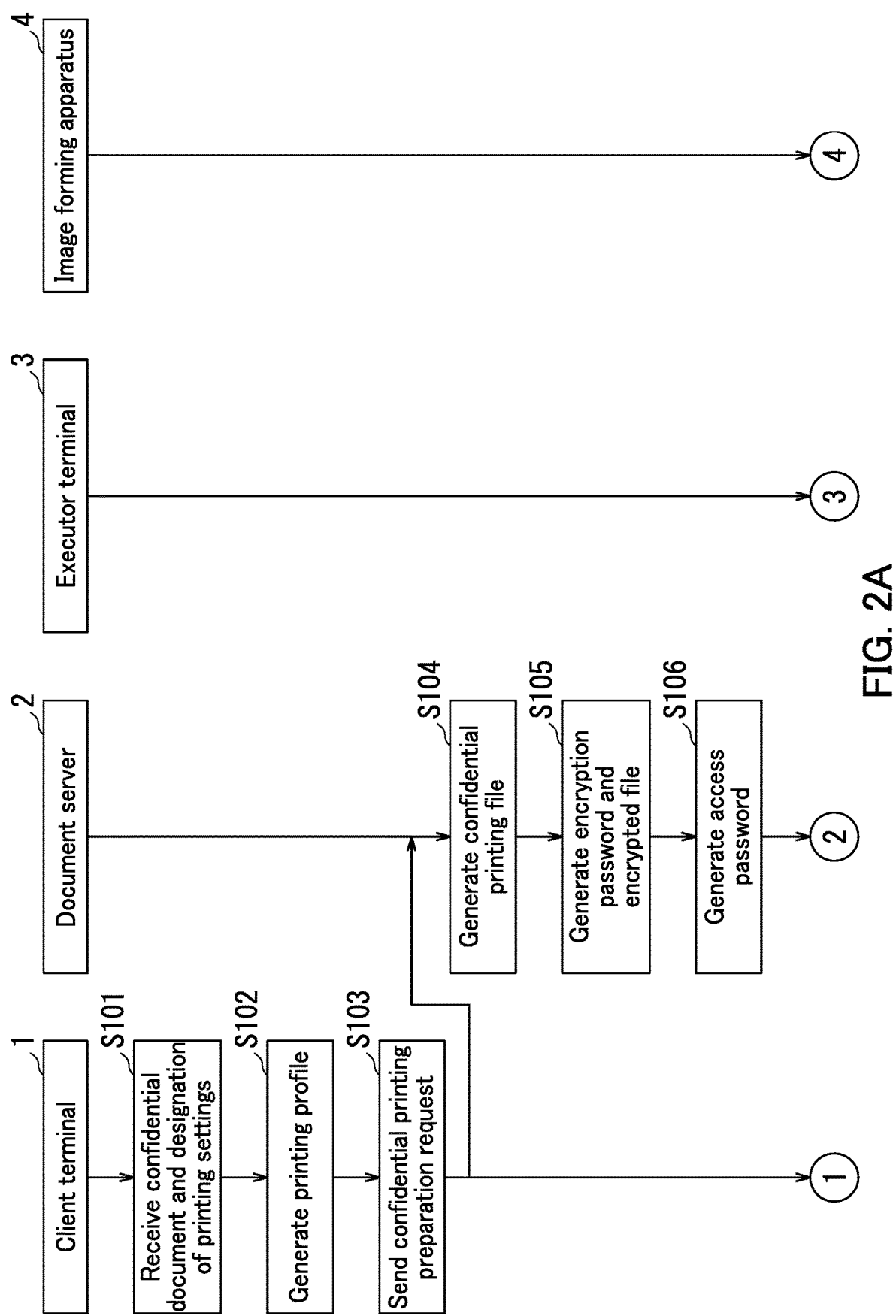
FIG. 2A is a sequence diagram which describes a printing preparation operation in the image forming system illustrated in FIG. 1.
Figure 2B:
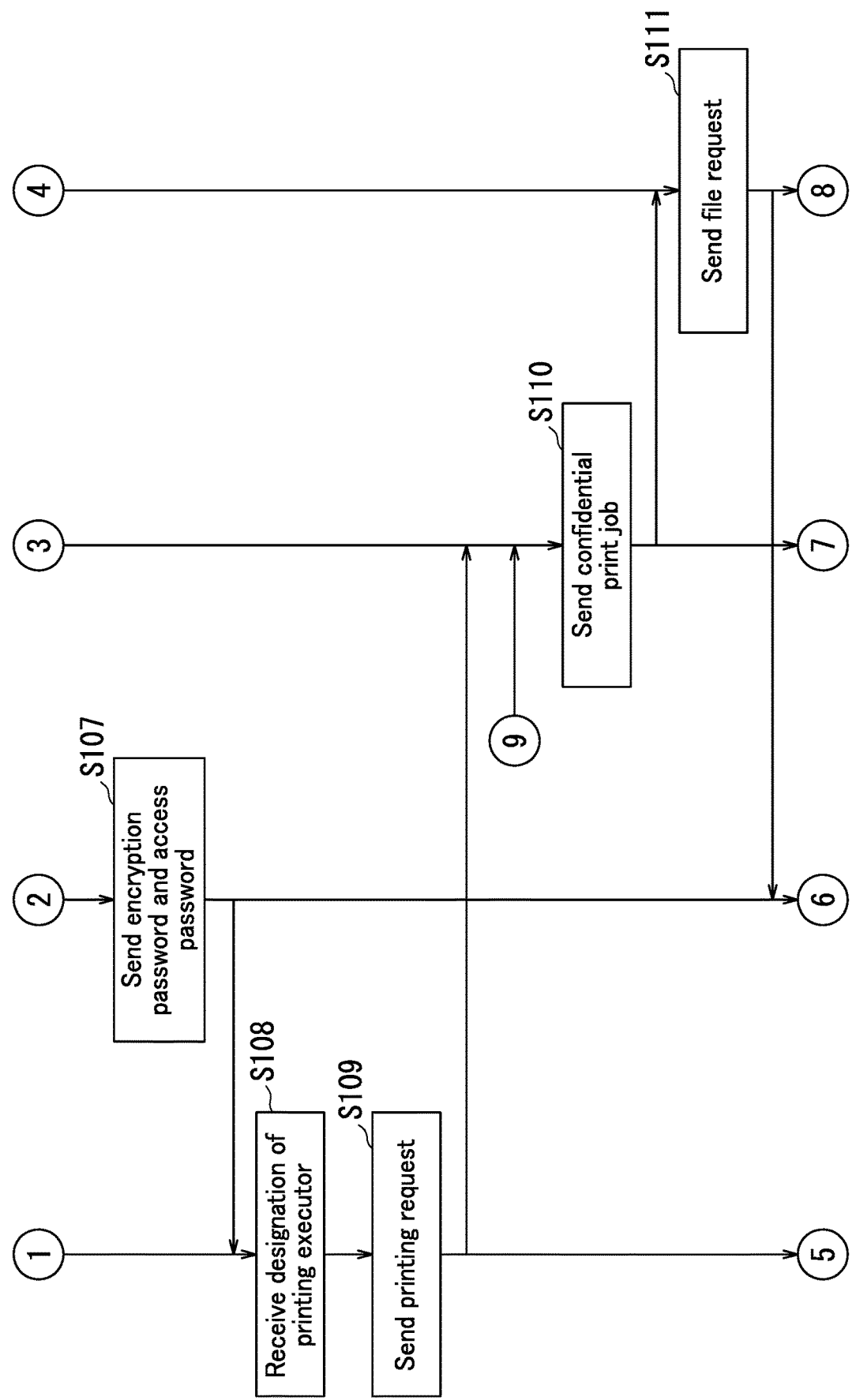
FIG. 2B is a continuation of the sequence diagram illustrated in FIG. 2A.
Figure 2C:
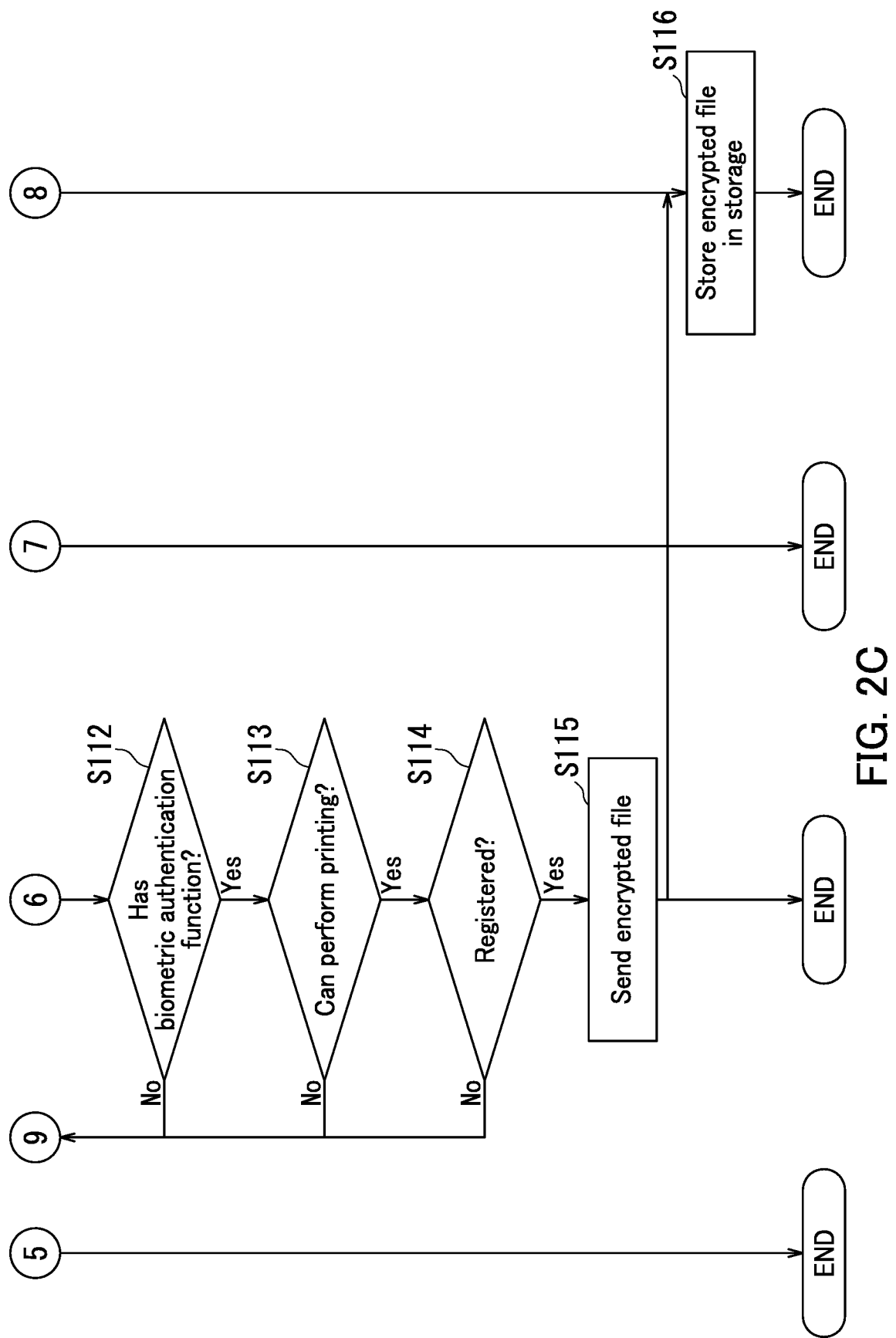
FIG. 2C is a continuation of the sequence diagram illustrated in FIG. 2B.

A printing preparation operation is described in detail with reference to FIGS. 2A to 2C. The printing preparation operation is performed before the printing executor B requested to print the confidential document 21 from the printing client A starts printing through the image forming apparatus 4. FIG. 2A is a sequence diagram which describes the printing preparation operation in the image forming system 100. FIG. 2B is a continuation of the sequence diagram illustrated in FIG. 2A. FIG. 2C is a continuation of the sequence diagram illustrated in FIG. 2B.

The client terminal 1 receives a designation of the confidential document 21 to be printed and a designation of various printing settings through operation of the printing client A (Step S101). The designation of various printing settings includes items such as printing unit quantity, size, and color or monochrome.

Next, the client terminal 1 generates a printing profile from designated printing settings (Step S102). The client terminal 1 sends a confidential printing preparation request for the designated confidential document 21 to the document server 2 (Step S103). The confidential printing preparation request includes the printing profile generated by the client terminal 1.

Upon receiving the confidential printing preparation request, the document server 2 generates a confidential printing file (Step S104).

Next, the document server 2 functions as the password generating section 22. The document server 2 generates an encryption password which encrypts the confidential printing file. Then, the document server 2 functions as the encrypted file generating section 23. The document server 2 generates an encrypted file in which the confidential printing file has been encrypted by secret key cryptography (Step S105). Secret key cryptography is a method in which the same password is used for encryption and decryption. The password to be used is the encryption password generated by the document server 2.

Next, the document server 2 functions as the password generating section 22. The document server 2 generates the access password for accessing the encrypted file (Step S106).

The document server 2 also functions as the password sending section 24. The document server 2 sends the file address, the encryption password, and the access password of the encrypted file to the client terminal 1 (Step S107).

Having received the file address, the encryption password, and the access password, the client terminal 1 receives, through operation by the printing client A, a designation of the printing executor B to perform printing (Step S108). For example, the client terminal 1 accesses the authentication server 5. The client terminal 1 may then receive the designation of the printing executor B from among candidates with biometric information registered in the authentication information 51.

Next, the client terminal 1 sends a printing request to the executor terminal 3 of the printing executor B (Step S109). The printing request includes the file address, the encryption password, and the access password. Note that the printing request may be delivered to the printing executor B via facsimile, postal mail of a paper medium, or the like.

Next, the printing executor B who has received the printing request operates the executor terminal 3 to send a confidential print job and a user ID specifying themselves (the printing executor B) to the image forming apparatus 4 which performs printing (Step S110). The confidential print job includes the file address, the encryption password, and the access password.

The controller 7 of the image forming apparatus 4 which has received the confidential print job functions as the confidential file acquiring section 71. The confidential file acquiring section 71 sends a file request to the document server 2 (Step S111). The file request includes the file address, the access password, and a function list of the image forming apparatus 4.

Having received the file request, the document server 2 specifies the encrypted file according to the file address and determines whether or not the image forming apparatus 4 has a biometric authentication function needed for confidential printing according to the function list (Step S112).

When the image forming apparatus 4 has the biometric authentication function needed for confidential printing in Step S112, the document server 2 determines whether or not printing can be performed based on the printing profile according to the function list (Step S113).

When printing can be performed according to the printing profile in Step S113, the document server 2 determines whether or not the image forming apparatus 4 is registered in the output device information 52 of the authentication server 5 based on the MAC address or the IP address of the image forming apparatus 4 (Step S114).

When the image forming apparatus 4 is registered in the output device information 52 in Step S114, the document server 2 functions as the encrypted file sending section 25. The document server 2 sends the encrypted file which has been authenticated with the access password to the image forming apparatus 4 (Step S115).

The confidential file acquiring section 71 stores the received encrypted file and encryption password in the storage 43 in association with the user ID designating the printing executor B (Step 116). The image forming apparatus 4 enters standby to perform confidential printing. Therefore, the image forming apparatus 4 completes the preparation operation for confidential printing.

Note that when a negative determination is made in any of Steps S112 to S114, the document server 2 denies transmission of the confidential printing file. Then, the document server 2 notifies the executor terminal 3 that transmission has been denied. Therefore, the printing executor B returns to Step S110 and selects another image forming apparatus 4 to which the confidential print job is to be sent.

Figure 3A:
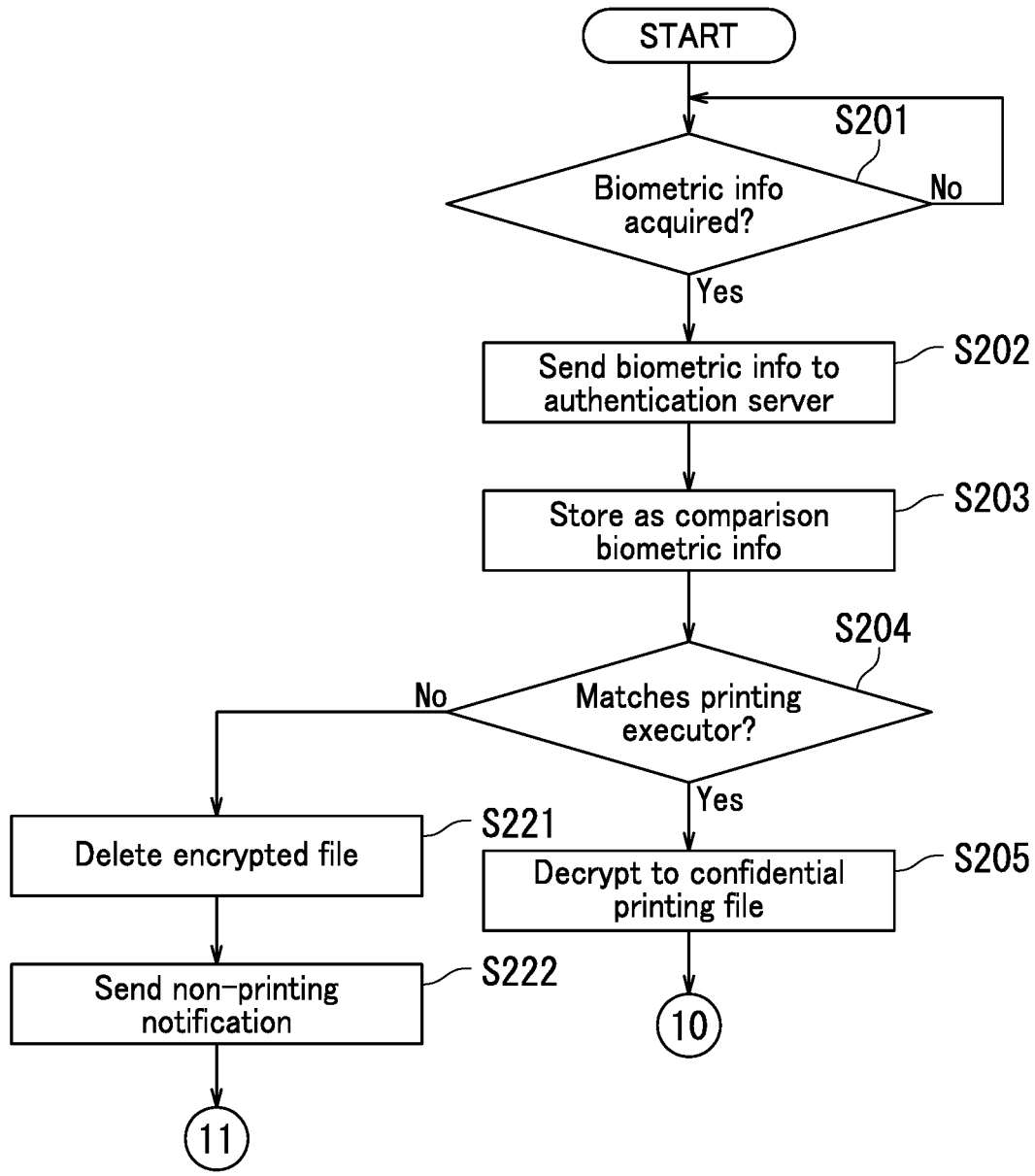
FIG. 3A is a flowchart describing a confidential printing operation in the image forming apparatus illustrated in FIG. 1.
Figure 3B:
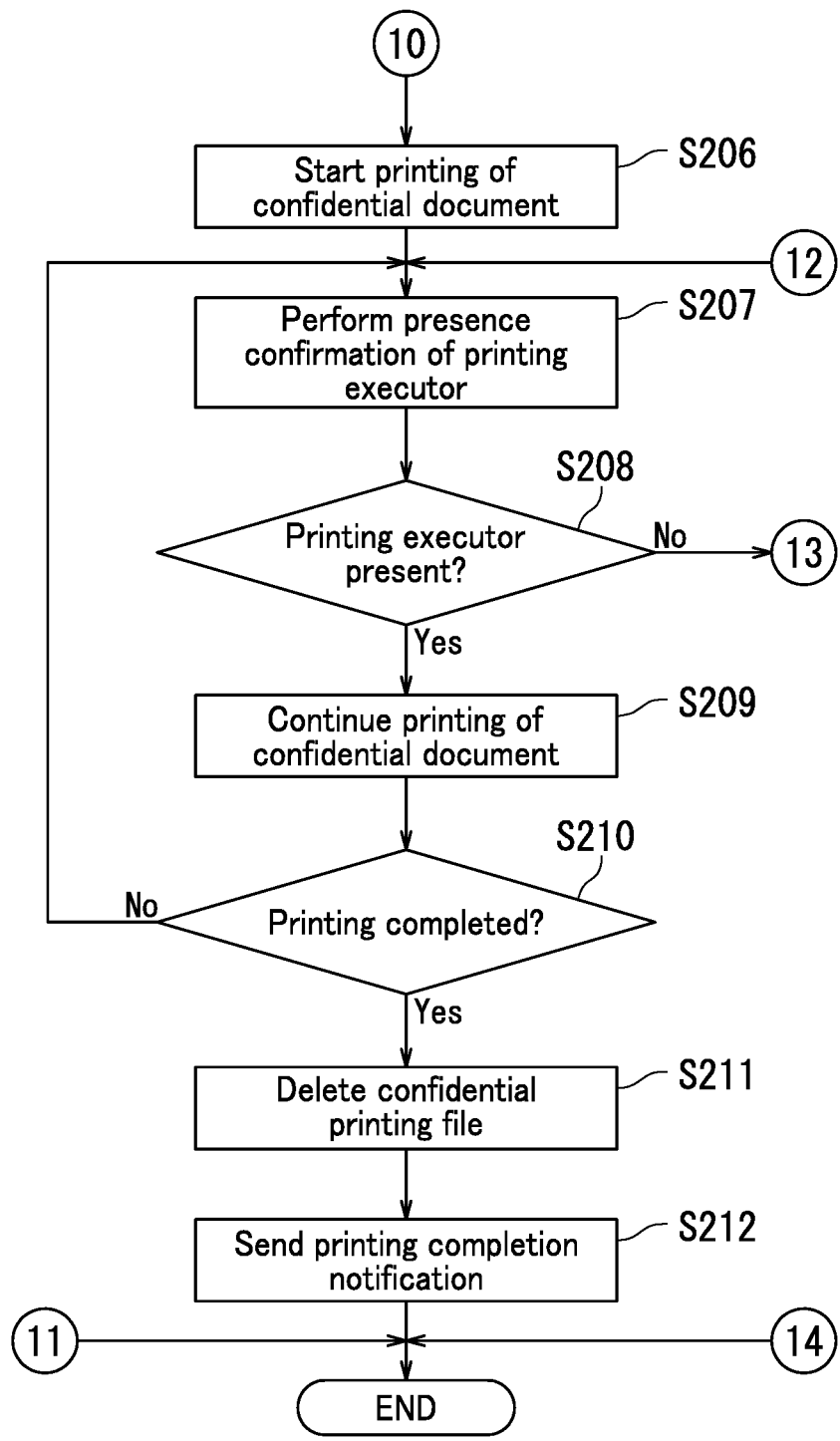
FIG. 3B is a continuation of the flowchart illustrated in FIG. 3A.
Figure 3C:
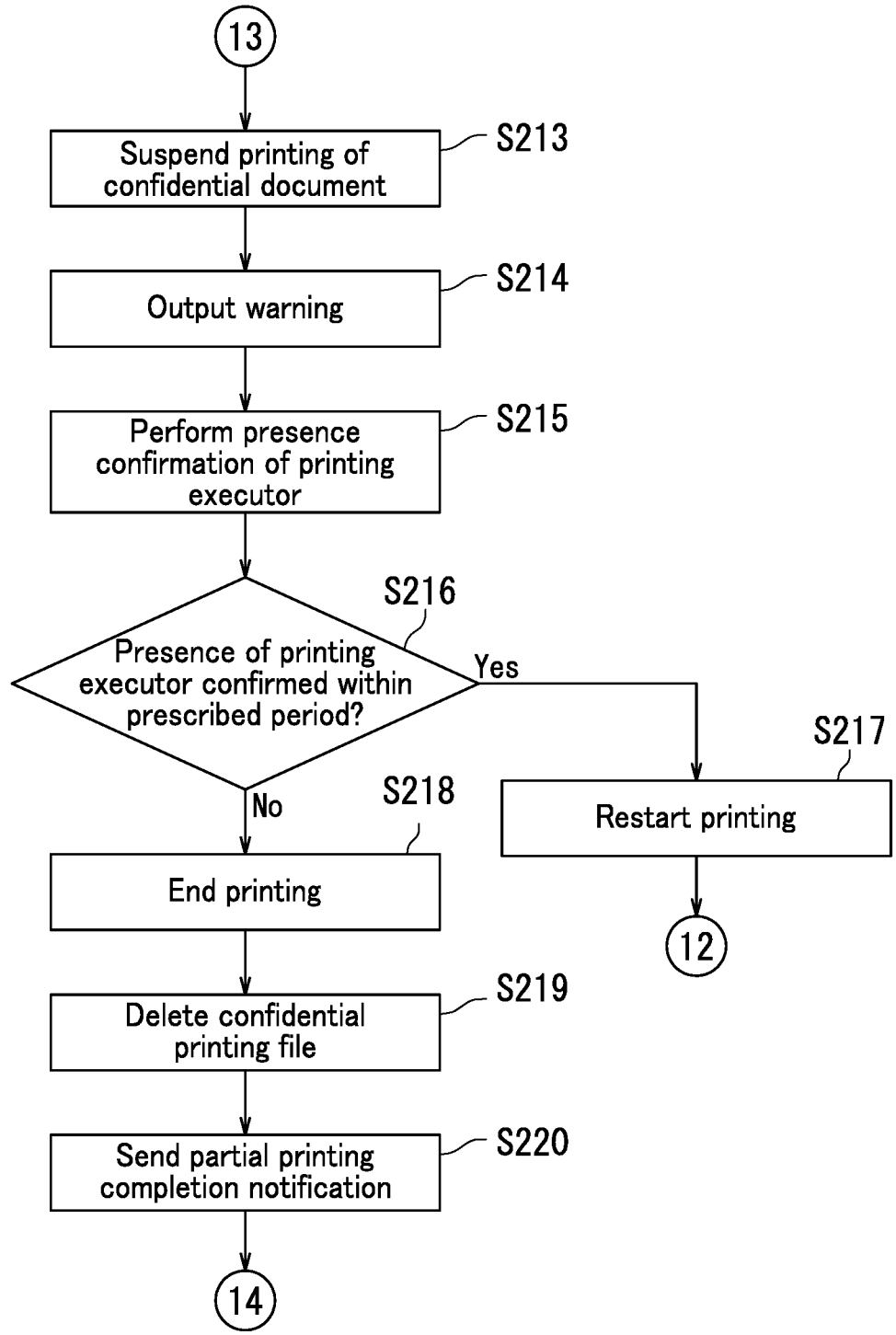
FIG. 3C is a continuation of the flowchart illustrated in FIG. 3B.

Next, a confidential printing operation performed by the printing executor B through the image forming apparatus 4 is described in detail with reference to FIGS. 3A to 3C. FIG. 3A is a flowchart describing the confidential printing operation in the image forming apparatus 4 illustrated in FIG. 1. FIG. 3B is a continuation of the flowchart illustrated in FIG. 3A. FIG. 3C is a continuation of the flowchart illustrated in FIG. 3B.

The biometric information reading section 46 determines whether biometric information has been acquired. When an encrypted file is temporarily saved in the storage 43, the controller 7 functions as the biometric information sending section 72. When the encrypted file is temporarily saved in the storage 43, the biometric information reading section 46 enters standby to acquire biometric information (Step S201).

When biometric information is acquired in Step S201, the biometric information sending section 72 sends the acquired biometric information and the user ID specifying the printing executor B to the authentication server 5 (Step S202). The biometric information sending section 72 also stores the acquired biometric information in the storage 43 as comparison biometric information (Step S203).

Next, the controller 7 determines whether or not the biometric information matches the user ID specifying the printing executor B to perform confidential printing based on an authentication result from the authentication server 5 (Step S204).

When the biometric information matches the user ID specifying the printing executor B in Step S204, the controller 7 functions as the decrypting section 73. The decrypting section 73 decrypts the encrypted file into a confidential printing file using the encryption password (Step S205).

Next, the controller 7 functions as the confidential printing section 74. The confidential printing section 74 starts printing of the confidential document 21 with the settings of the printing profile (Step S206). Note that because the printing profile is also encrypted before printing of the confidential document 21 is started, falsification of the printing profile can be prevented. As a result, the confidential document 21 is printed as intended by the printing client A.

When printing of the confidential document 21 starts in Step S206, the controller 7 functions as the authentication section 75. The authentication section 75 causes the biometric information reading section 46 to acquire biometric information. Then, the authentication section 75 performs presence confirmation of the printing executor B by comparing the comparison biometric information stored in the storage 43 to the acquired biometric information (Step S207). Furthermore, the authentication section 75 determines whether or not the presence of the printing executor B has been confirmed (Step S208).

When the presence of the printing executor B has been confirmed in Step S208, the confidential printing section 74 continues printing of the confidential document 21 (Step S209). The confidential printing section 74 then determines whether or not printing has completed (Step S210).

When the printing is not completed in Step S210, the authentication section 75 returns to Step S207 to perform presence confirmation of the printing executor B. The authentication section 75 performs Steps S207 to S210 at a prescribed interval (an interval of several seconds, for example). Therefore, printing of the confidential document 21 continues under the condition that the printing executor B is present in the immediate vicinity of the image forming apparatus 4. Accordingly, an image of the confidential document 21 is formed in a state in which the image forming apparatus 4 has confirmed that the printing executor B is in the immediate vicinity of the image forming apparatus 4. As a result, security can also be ensured during image formation.

When printing is completed in Step S210, the controller 7 deletes the confidential printing file, the encryption password, and the comparison biometric information from the storage 43 (Step S211). The controller 7 then sends a printing completion notification to the client terminal 1 notifying that printing of the confidential document 21 has been completed (Step S212), and the confidential printing process ends.

When the presence of the printing executor B is not confirmed in Step S208 because biometric information cannot be acquired by the biometric information reading section 46 or does not match the comparison biometric information stored in the storage 43, the confidential printing section 74 suspends printing of the confidential document 21 (Step S213). Furthermore, the confidential printing section 74 outputs a warning from the operation section 41 by sound or display (Step S214).

Note that the warning of Step S214 may be output when the controller 7 has determined that printed matter is remaining. The controller 7 determines whether or not printed matter is remaining based on, for example, an imaging result of a camera which captures an image of printed matter output from the image forming apparatus 4 or a measurement result of a scale which measures the weight of printed matter.

Next, the authentication section 75 performs presence confirmation of the printing executor B (Step S215). The authentication section 75 determines whether or not the presence of the printing executor B can be confirmed within a prescribed period (Step S216).

When the presence of the printing executor B can be confirmed within the prescribed period in Step S216, the confidential printing section 74 restarts printing (Step S217). The process returns to Step S207 and the authentication section 75 performs presence confirmation of the printing executor B.

When the presence of the printing executor B cannot be confirmed within the prescribed period in Step S216, the confidential printing section 74 ends printing (Step S218). The controller 7 then deletes the confidential printing file, the encryption password, and the comparison biometric information from the storage 43 (Step S219). The controller 7 then sends a partial printing completion notification to the client terminal 1 (Step S220) and ends the confidential printing operation. The partial printing completion notification is a notification which notifies that printing of the confidential document 21 has been partially completed. Note that by including information of pages for which printing has been completed in the printing partial completion notification, duplicate printing of the pages for which printing has been completed can be favorably avoided.

When the biometric information does not match the printing executor B in Step S204, the controller 7 deletes the encrypted file and the encryption password from the storage 43 (Step S221). The controller 7 then sends a non-printing notification to the client terminal 1 (Step S222) and ends the confidential printing operation. The non-printing notification is a notification which notifies that printing of the confidential document 21 has not been performed.

Note that when the biometric information does not match the printing executor B in Step S204, reauthentication may be performed a preset designated number of times. Reauthentication means that the controller 7 determines whether or not biometric information matches the user ID specifying the printing executor B to perform confidential printing.

Note that according to the present embodiment, the biometric information reading section 46 and the authentication section 75 are used to authenticate biometric information, but a smartphone including a fingerprint authentication function or a facial authentication function may also be used as the biometric information reading section 46 and the authentication section 75. In this case, the Global Positioning System (GPS), a beacon, a mounted camera, an indoor camera, ultrasonic measurement, or the like may be used to determine that the distance between the image forming apparatus 4 and the smartphone is less than a designated distance.

According to the present disclosure as described above, the image forming system 100 includes the image forming apparatus 4 which performs image formation of the received confidential document 21 and the authentication server 5 which authenticates, based on biometric information, the printing executor B who is to operate the image forming apparatus 4 to perform the image formation. The image forming apparatus 4 and the authentication server 5 are connected through the network 6. The image forming apparatus 4 includes: the storage 43 which functions as confidential document storage that stores the received confidential document 21 therein; the biometric information reading section 46 which reads and acquires the biometric information of the printing executor B; the biometric information sending section 72 which sends the biometric information acquired by the biometric information reading section 46 to the authentication server 5; the confidential printing section 74 which is a confidential image forming section that starts the image formation of the confidential document 21 when the printing executor B has been authenticated by the authentication server 5; the storage 43 which functions as biometric information storage that stores therein the biometric information acquired by the biometric information reading section 46 as comparison biometric information; and the authentication section 75 which performs presence confirmation of the printing executor B by acquiring the biometric information through the biometric information reading section 46 and comparing the biometric information to the comparison biometric information during the image formation of the confidential document 21. The confidential printing section 74 continues the image formation of the confidential document 21 under a condition that the presence of the printing executor B is confirmed by the authentication section 75 and suspends the image formation of the confidential document 21 when the presence of the printing executor B is not confirmed by the authentication section 75 within a prescribed period.

Through this configuration, security can also be ensured during printing because the image formation of the confidential document 21 is performed in a state in which the image forming apparatus 4 has confirmed that the printing executor B is present in the immediate vicinity of the image forming apparatus 4.

Furthermore, according to the present embodiment, the confidential printing section 74 deletes the confidential document 21 from the confidential document storage when the presence of the printing executor B is not confirmed by the authentication section 75 within the prescribed period.

Through this configuration, leakage of the confidential document 21 can be prevented and the security of the confidential document 21 can be ensured when image formation of the confidential document 21 is partially completed.

Furthermore, according to the present embodiment, the image forming apparatus 4 includes the operation section 41 which functions as a warning output section that outputs a warning when the presence of the printing executor B is not confirmed by the authentication section 75.

Through this configuration, separation of the printing executor B from the image forming apparatus 4 can be prevented and the security of the confidential document 21 can be ensured.

Furthermore, according to the present disclosure, the image forming system 100 includes: the document server 2 which encrypts the confidential document 21 and the printing profile (image formation profile) as an encrypted file and generates the access password for the encrypted file and the encryption password that decrypts the encrypted file; and the executor terminal 3 which sends the access password to the image forming apparatus 4 as a confidential print job (confidential image formation job). The document server 2 and the executor terminal 3 are connected through the network 6. The image forming apparatus 4 includes: the confidential file acquiring section 71 which, upon receipt of the confidential print job, receives the encrypted file and the encryption password from the document server 2 by sending the access password to the document server 2 and stores the encrypted file and the encryption password in the confidential document storage; and the decrypting section 73 which decrypts the encrypted file into the confidential document 21 and the printing profile using the encryption password when the printing executor B has been authenticated by the authentication server 5. The confidential printing section 74 starts the image formation of the confidential document 21 based on the printing profile when the printing executor B has been authenticated by the authentication server 5.

Through this configuration, the printing profile of the confidential document 21 can be set in advance by the printing client A who requests the printing executor B to print the confidential document 21.

Note that the present disclosure is not limited to the above embodiment, and it is clear that the embodiment can be variously altered within a scope of the technical idea of the present disclosure. Aspects of the above elements of configuration, such as number, position, and shape, are not limited to the above embodiment. The aspects may be any number, position, shape, or the like suitable to implement the present disclosure. Note that elements of configuration which are the same are labeled with the same reference signs in the drawings.

What is claimed is:

1. An image forming system comprising:
an image forming apparatus configured to perform image formation of a received confidential document designated by a client terminal; and
an authentication server configured to authenticate, based on biometric information, an executor who is to operate the image forming apparatus to perform the image formation, wherein
the image forming apparatus and the authentication server are connected through a network,
the image forming apparatus includes confidential document storage, a biometric information reading section, a controller, and biometric information storage,
the controller functions as a biometric information sending section, a confidential image forming section, and an authentication section,
the confidential document storage stores the received confidential document therein,
the biometric information reading section reads and acquires biometric information of the executor,
the biometric information sending section sends the biometric information acquired by the biometric information reading section to the authentication server,
the confidential image forming section starts the image formation of the confidential document when the executor has been authenticated by the authentication server,
the biometric information storage which stores therein the biometric information acquired by the biometric information reading section as comparison biometric information,
the authentication section performs presence confirmation of the executor by acquiring biometric information through the biometric information reading section and comparing the biometric information to the comparison biometric information during the image formation of the confidential document,
the confidential image forming section continues the image formation of the confidential document under a condition that the presence of the executor is confirmed by the authentication section and suspends and ends the image formation of the confidential document when the presence of the executor is not confirmed by the authentication section within a prescribed period,
the controller sends a partial completion notification of the image formation to the client terminal,
the partial completion notification includes information of a page on which the image formation has been completed,
the image forming system further comprises:
a document server configured to encrypt the confidential document and an image formation profile as an encrypted file and generate an access password for the encrypted file and an encryption password which decrypts the encrypted file, and
an executor terminal configured to send the access password to the image forming apparatus as a confidential image formation job,
the document server and the executor terminal are connected through the network,
the controller of the image forming apparatus further functions as a confidential file acquiring section and a decrypting section,
upon receipt of the confidential image formation job, the confidential file receiving section receives the encrypted file and the encryption password from the document server by sending the access password to the document server and stores the encrypted file and the encryption password in the confidential document storage; and the decrypting section decrypts the encrypted file into the confidential document and the image formation profile using the encryption password when the executor has been authenticated by the authentication server, and the confidential image forming section starts the image formation of the confidential document based on the image formation profile when the executor has been authenticated by the authentication server.

2. The image forming system according to claim 1, wherein the confidential image forming section deletes the confidential document from the confidential document storage when the presence of the executor is not confirmed by the authentication section within the prescribed period.

3. The image forming system according to claim 1, wherein the image forming apparatus includes a warning output section which outputs a warning when the presence of the executor is not confirmed by the authentication section.

4. The image forming system according to claim 1, wherein the document server receives from the client terminal an image formation preparation request for the confidential document designated by the client terminal, generates the confidential document and the image formation profile in response to receiving the image formation preparation request, and sends the access password and the encryption password to the client terminal, and the executor terminal receives the access password and the encryption password from the client terminal, and sends the confidential image formation job to the image forming apparatus in response to receiving the access password and the encryption password.

\* \* \* \* \*